(12) United States Patent
Wang et al.

(10) Patent No.: US 10,939,361 B2
(45) Date of Patent: Mar. 2, 2021

(54) CONTROL INFORMATION SENDING METHOD, CONTROL INFORMATION RECEIVING METHOD, AND DEVICE

(71) Applicant: Huawei Technologies Co., Ltd., Shenzhen (CN)

(72) Inventors: Da Wang, Shenzhen (CN); Jian Wang, Beijing (CN); Yongbo Zeng, Beijing (CN); Nathan Edward Tenny, San Diego, CA (US); Haibo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 16/324,757

(22) PCT Filed: Aug. 12, 2016

(86) PCT No.: PCT/CN2016/095052
§ 371 (c)(1),
(2) Date: Feb. 11, 2019

(87) PCT Pub. No.: WO2018/027990
PCT Pub. Date: Feb. 15, 2018

(65) Prior Publication Data
US 2019/0182756 A1    Jun. 13, 2019

(51) Int. Cl.
*H04W 48/12*    (2009.01)
*H04W 72/12*    (2009.01)

(52) U.S. Cl.
CPC ....... *H04W 48/12* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 8,654,724 B2 * | 2/2014 | Sumasu | H04W 72/042 370/329 |
| 10,314,059 B2 * | 6/2019 | Lee | H04W 16/14 |

(Continued)

FOREIGN PATENT DOCUMENTS

| | | |
|---|---|---|
| CN | 101425840 A | 5/2009 |
| CN | 101669399 A | 3/2010 |

(Continued)

OTHER PUBLICATIONS

Qualcomm Incorporated, "Candidate Frame Structures," R1-164695, 3GPP TSG-RAN WG1 #85 Nanjing, China, May 23-27, 2016, 8 pages.

(Continued)

*Primary Examiner* — Ajit Patel
(74) *Attorney, Agent, or Firm* — Conley Rose, P.C.

(57) ABSTRACT

A control information sending method, a control information receiving method, and a device, where a first device sends first control information to a second device on a first resource such that second device prepares data information based on the first control information and waits for sending the data information. The first device sends second control information on a second resource different from the first resource such that the second device sends the data information based on the second control information. The first resource is different from the second resource such that a duration of preparing the data information by the second device is greatly greater than an interval between control information and uplink data in one time interval, and the second device has sufficient time to prepare the data information.

15 Claims, 7 Drawing Sheets

(56) References Cited

U.S. PATENT DOCUMENTS

| | | | |
|---|---|---|---|
| 2008/0175195 A1* | 7/2008 | Cho | H04L 1/1861 370/329 |
| 2009/0213805 A1 | 8/2009 | Zhang et al. | |
| 2009/0238131 A1 | 9/2009 | Montojo et al. | |
| 2009/0316814 A1* | 12/2009 | Seo | H04B 7/0665 375/260 |
| 2010/0098008 A1 | 4/2010 | Ishii et al. | |
| 2010/0238823 A1* | 9/2010 | Chen | H04W 72/1289 370/252 |
| 2012/0213163 A1 | 8/2012 | Lee et al. | |
| 2013/0039307 A1 | 2/2013 | Han et al. | |
| 2013/0058304 A1* | 3/2013 | Kim | H04W 72/1289 370/329 |
| 2014/0092829 A1* | 4/2014 | Han | H04L 5/0035 370/329 |
| 2014/0133365 A1 | 5/2014 | Peng et al. | |
| 2014/0376422 A1* | 12/2014 | Dai | H04L 5/0053 370/280 |
| 2015/0334686 A1 | 11/2015 | Ji et al. | |
| 2016/0007341 A1* | 1/2016 | Nogami | H04L 1/1812 370/329 |
| 2016/0150510 A1 | 5/2016 | Shao et al. | |
| 2017/0005764 A1* | 1/2017 | Park | H04L 5/0051 |
| 2017/0078126 A1* | 3/2017 | Einhaus | H04W 72/042 |
| 2017/0079065 A1 | 3/2017 | Lyu et al. | |
| 2017/0180952 A1* | 6/2017 | Kim | H04W 72/121 |
| 2017/0318565 A1* | 11/2017 | Golitschek Edler von Elbwart | H04W 72/042 |
| 2018/0007625 A1* | 1/2018 | Yu | H04W 48/12 |

FOREIGN PATENT DOCUMENTS

| | | |
|---|---|---|
| CN | 101978634 A | 2/2011 |
| CN | 102202400 A | 9/2011 |
| CN | 102740476 A | 10/2012 |
| CN | 103313400 A | 9/2013 |
| CN | 103384976 A | 11/2013 |
| CN | 105391532 A | 3/2016 |
| WO | 2015180175 A1 | 12/2015 |

OTHER PUBLICATIONS

Mediatek Inc,"Flexible Frame Structure for New Radio Access Technology," R1-165163, 3GPP TSG RAN WG1 Meeting #85, Nanjing, China, May 23-27, 2016, 6 pages.

Foreign Communication From A Counterpart Application, European Application No. 16912445.0, Extended European Search Report dated Jun. 3, 2019, 17 pages.

Ericsson, "NR Frame Structure Timing Relations", R1-165739, 7.1.4, May 30, 2016, 4 pages.

Nokia, et al., "URLLC U-Plane Latency Analysis," 3GPP TSG-RAN WG1 #85, R1-165028, Nanjing, P.R. China, May 23-27, 2016, 8 pages.

3GPP TS 36.213 V132.0, 3rd Generation Partnership Project; Technical Specification Group Radio Access Network; Evolved Universal Terrestrial Radio Access (E-UTRA); Physical layer procedures (Release 13), Jun. 2016, 381 pages.

3GPP TS 36.211 V13.2.0, 3rd Generation Partnership Project; Technical Specification Group Radio Access Network; Evolved Universal Terrestrial Radio Access (E-UTRA); Physical channels and modulation (Release 13), Jun. 2016, 168 pages.

Foreign Communication From A Counterpart Application, PCT Application No. PCT/CN2016095052, English Translation of International Search Report dated Apr. 12, 2017, 2 pages.

Foreign Communication From A Counterpart Application, PCT Application No. PCT/CN2016095052, English Translation of Written Opinion dated Apr. 12, 2017, 4 pages.

Machine Translation and Abstract of Chinese Publication No. CN102740476, Oct. 17, 2012, 68 pages.

Foreign Communication From A Counterpart Application, Chinese Application No. 2016800086532.9, Chinese Office Action dated Dec. 13, 2019, 6 pages.

\* cited by examiner

CONTROL INFORMATION SENDING METHOD, CONTROL INFORMATION RECEIVING METHOD, AND DEVICE

CROSS-REFERENCE TO RELATED APPLICATIONS

This application is a U.S. National Stage of International Patent Application No. PCT/CN2016/095052 filed on Aug. 12, 2016, which is hereby incorporated by reference in its entirety.

TECHNICAL FIELD

Embodiments of the present invention relate to the field of communications technologies, and in particular, to a control information sending method, a control information receiving method, and a device.

BACKGROUND

In Long Term Evolution (Long Term Evolution, LTE), subframes are classified into uplink subframes and downlink subframes. A base station sends downlink control information or downlink data to user equipment (User Equipment, UE) by using a downlink subframe. The downlink control information may be uplink scheduling information or the like. After receiving the uplink scheduling information, the UE prepares uplink data based on indication of the uplink scheduling information, and then sends the prepared uplink data to the base station in a resource location indicated by the uplink scheduling information. In this process, a time of preparing the uplink data by the UE is usually greater than or equal to 4 ms.

With continuous development of technologies, in the future $5^{th}$ Generation Mobile Communication (the $5^{th}$ Generation Mobile Communication, 5G), a self-contained (self-contain) subframe gradually emerges through evolution. Different from the uplink subframe or the downlink subframe in LTE, the self-contained subframe includes both downlink control information and uplink data in a time interval (time interval). There is an interval between the downlink control information (which is, for example, uplink scheduling information) and the uplink data. After receiving the uplink scheduling information, the UE prepares the uplink data in the interval, and then sends the uplink data.

However, the uplink scheduling information and the uplink data coexist in the self-contained subframe in the time interval, and the interval between the uplink scheduling information and the uplink data is very small. There is no sufficient time for the UE to prepare the uplink data in such a small interval. Therefore, for the self-contained subframe, how to send the uplink scheduling information by the base station so that the UE prepares the uplink data based on the uplink scheduling information and sends the uplink data is a problem to be urgently resolved in the industry.

SUMMARY

Embodiments of the present invention provide a control information sending method, a control information receiving method, and a device, so that when control information and uplink data coexist in a time interval, UE prepares uplink data based on control information sent by a base station and sends the uplink data.

According to a first aspect, an embodiment of the present invention provides a control information sending method. The method is described from the perspective of a first device, that is, a transmit end. In the method, the first device sends first control information to a second device on a first resource, so that the second device prepares data information based on the first control information and waits for sending the data information. The first device sends second control information on a second resource different from the first resource, so that the second device sends the data information based on the second control information.

In the foregoing method, the first resource is different from the second resource, so that a duration of preparing the data information by the second device is greatly greater than an interval between control information and uplink data in one time interval, and the second device has sufficient time to prepare the data information. In this way, when the control information and the uplink data coexist in one time interval, the second device prepares the data information based on the first control information sent by the first device and sends the data information based on the second control information.

In a feasible implementation, that the first resource is different from the second resource may be that a time resource, a frequency resource, or a codeword resource in the first resource is different from that in the second resource.

In the foregoing manner, the first resource and the second resource that are different are flexibly selected.

In a feasible implementation, the first control information includes a first index, the second control information includes a second index, and the second index corresponds to the first index.

In a feasible implementation, that the second index corresponds to the first index may be that the second index is the same as the first index, differs from the first index by an offset value, corresponds to the first index based on a function relationship, or corresponds to the first index based on a table relationship.

In the foregoing manner, a correspondence between the first index and the second index is flexibly set.

In a feasible implementation, the second control information instructs the second device to send or not to send the data information. For example, the second control information instructs, by using indication information, the second device to send or not to send the data information. For another example, the second control information instructs, by using the second index, the second device to send or not to send the data information. For still another example, the second control information instructs, by using a particular scrambling code of the second device, the second device to send or not to send the data information. For still another example, the second control information instructs, by using a cyclic redundancy check code CRC of the second device, to send or not to send the data information.

In the foregoing manner, the second device is flexibly instructed whether to send the data information.

In a feasible implementation, the first control information indicates a quantity of physical resource blocks PRBs used by the second device to send the data information and a location of the PRBs used by the second device to send the data information. Alternatively, the first control information indicates a quantity of physical resource blocks PRBs used by the second device to send the data information, and the second control information indicates a location of the PRBs used by the second device to send the data information.

In a feasible implementation, the sending, by a first device, first control information to a second device on a first resource includes:

sending, by the first device, the first control information to the second device on the first resource by using downlink control information DCI, to dynamically send the first control information; or sending, by the first device, the first control information to the second device on the first resource by using Radio Resource Control RRC, to semi-statically send the first control information; or sending, by the first device, the first control information to the second device on the first resource by using a system broadcast message MIB or a system message SIB.

In a feasible implementation, the sending, by the first device, second control information to the second device on a second resource includes:

sending, by the first device, the second control information to the second device on the second resource by using downlink control information DCI, to dynamically send the second control information; or sending, by the first device, the first control information to the second device on the second resource by using Radio Resource Control RRC, to semi-statically send the second control information; or sending, by the first device, the second control information to the second device on the second resource by using a system broadcast message MIB or a system message SIB.

According to a second aspect, an embodiment of the present invention provides a control information receiving method. The method is described from the perspective of a second device, that is, a receive end. In the method, a first device sends first control information to the second device on a first resource. Correspondingly, the second terminal receives the first control information, prepares data information based on the first control information, and waits for sending the data information. The second device further receives second control information sent by the first device on a second resource different from the first resource, and sends the data information based on the second control information.

In the foregoing method, the first resource is different from the second resource, so that a duration of preparing the data information by the second device is greatly greater than an interval between control information and uplink data in one time interval, and the second device has sufficient time to prepare the data information. In this way, when the control information and the uplink data coexist in one time interval, the second device prepares the data information based on the first control information sent by the first device and sends the data information based on the second control information.

In a feasible implementation, that the first resource is different from the second resource may be that a time resource, a frequency resource, or a codeword resource in the first resource is different from that in the second resource.

In a feasible implementation, the first control information includes a first index, the second control information includes a second index, and the second index corresponds to the first index.

In a feasible implementation, that the second index corresponds to the first index includes: the second index is the same as the first index, differs from the first index by an offset value, corresponds to the first index based on a function relationship, or corresponds to the first index based on a table relationship.

In a feasible implementation, the second device determines, based on the second control information, whether to send the data information to the first device.

In a feasible implementation, that the second device determines, based on the second control information, whether to send the data information to the first device includes: determining, by the second device based on indication information included in the second control information, whether to send the data information to the first device; or determining, by the second device based on the second index in the second control information, whether to send the data information to the first device; or determining, by the second device based on a particular scrambling code of the second device, whether to send the data information to the first device; or determining, by the second device based on a cyclic redundancy check code CRC of the second device, whether to send the data information to the first device.

In a feasible implementation, the first control information indicates a quantity of physical resource blocks PRBs used by the second device to send the data information and a location of the PRBs used by the second device to send the data information. Alternatively, the first control information indicates a quantity of physical resource blocks PRBs used by the second device to send the data information, and the second control information indicates a location of the PRBs used by the second device to send the data information.

In a feasible implementation, the receiving, by a second device, first control information sent by a first device on a first resource includes: receiving, by the second device, the first control information sent by the first device on the first resource by using downlink control information DCI; or receiving, by the second device, the first control information sent by the first device on the first resource by using Radio Resource Control RRC; or receiving, by the second device, the first control information sent by the first device on the first resource by using a system broadcast message MIB or a system message SIB.

In a feasible implementation, the receiving, by the second device, second control information sent by the first device on a second resource includes: receiving, by the second device, the second control information sent by the first device on the second resource by using downlink control information DCI; or receiving, by the second device, the second control information sent by the first device on the second resource by using Radio Resource Control RRC; or receiving, by the second device, the second control information sent by the first device on the second resource by using a system broadcast message MIB or a system message SIB.

According to a third aspect, an embodiment of the present invention provides a device. The device is a first device, and the first device includes a processor, a memory, a transceiver, and a system bus. The memory is connected to the processor and completes communication with the processor by using the system bus. The memory is configured to store a computer executable instruction. The processor is configured to run the computer executable instruction, so that the transceiver sends first control information to a second device on a first resource and sends second control information to the second device on a second resource.

The first resource is different from the second resource, and the first control information and the second control information are used to instruct the second device to send data information to the first device.

In a feasible implementation, that the first resource is different from the second resource may be that a time resource, a frequency resource, or a codeword resource in the first resource is different from that in the second resource.

In the foregoing manner, the first resource and the second resource that are different are flexibly selected.

In a feasible implementation, the first control information includes a first index, the second control information includes a second index, and the second index corresponds to the first index.

In a feasible implementation, that the second index corresponds to the first index may be that the second index is the same as the first index, differs from the first index by an offset value, corresponds to the first index based on a function relationship, or corresponds to the first index based on a table relationship.

In the foregoing manner, a correspondence between the first index and the second index is flexibly set.

In a feasible implementation, the second control information instructs the second device to send or not to send the data information. For example, the second control information instincts, by using indication information, the second device to send or not to send the data information. For another example, the second control information instructs, by using the second index, the second device to send or not to send the data information. For still another example, the second control information instructs, by using a particular scrambling code of the second device, the second device to send or not to send the data information. For still another example, the second control information instructs, by using a cyclic redundancy check code CRC of the second device, to send or not to send the data information.

In the foregoing manner, the second device is flexibly instructed whether to send the data information.

In a feasible implementation, the first control information indicates a quantity of physical resource blocks PRBs used by the second device to send the data information and a location of the PRBs used by the second device to send the data information. Alternatively, the first control information indicates a quantity of physical resource blocks PRBs used by the second device to send the data information, and the second control information indicates a location of the PRBs used by the second device to send the data information.

In a feasible implementation, sending, by the first device, the first control information to the second device on the first resource includes:

sending, by the first device, the first control information to the second device on the first resource by using downlink control information DCI, to dynamically send the first control information; or sending, by the first device, the first control information to the second device on the first resource by using Radio Resource Control RRC, to semi-statically send the first control information; or sending, by the first device, the first control information to the second device on the first resource by using a system broadcast message MIB or a system message SIB.

In a feasible implementation, sending, by the first device, the second control information to the second device on the second resource includes:

sending, by the first device, the second control information to the second device on the second resource by using downlink control information DCI, to dynamically send the second control information; or sending, by the first device, the first control information to the second device on the second resource by using Radio Resource Control RRC, to semi-statically send the second control information; or sending, by the first device, the second control information to the second device on the second resource by using a system broadcast message MIB or a system message SIB.

According to a fourth aspect, an embodiment of the present invention provides a device. The device is a second device, and the second device includes a processor, a memory, a transceiver, and a system bus. The memory is connected to the processor and completes communication with the processor by using the system bus. The memory is configured to store a computer executable instruction. The processor is configured to run the computer executable instruction, so that the transceiver receives first control information sent by a first device on a first resource and second control information sent by the first device on a second resource; and the transceiver sends data information to the first device based on the first control information and the second control information, where the first resource is different from the second resource.

In a feasible implementation, that the first resource is different from the second resource may be that a time resource, a frequency resource, or a codeword resource in the first resource is different from that in the second resource.

In the foregoing manner, the first resource and the second resource that are different are flexibly selected.

In a feasible implementation, the first control information includes a first index, the second control information includes a second index, and the second index corresponds to the first index.

In a feasible implementation, that the second index corresponds to the first index may be that the second index is the same as the first index, differs from the first index by an offset value, corresponds to the first index based on a function relationship, or corresponds to the first index based on a table relationship.

In the foregoing manner, a correspondence between the first index and the second index is flexibly set.

In a feasible implementation, the second control information instructs the second device to send or not to send the data information. For example, the second control information instructs, by using indication information, the second device to send or not to send the data information. For another example, the second control information instructs, by using the second index, the second device to send or not to send the data information. For still another example, the second control information instructs, by using a particular scrambling code of the second device, the second device to send or not to send the data information. For still another example, the second control information instructs, by using a cyclic redundancy check code CRC of the second device, to send or not to send the data information.

In the foregoing manner, the second device is flexibly instructed whether to send the data information.

In a feasible implementation, the first control information indicates a quantity of physical resource blocks PRBs used by the second device to send the data information and a location of the PRBs used by the second device to send the data information. Alternatively, the first control information indicates a quantity of physical resource blocks PRBs used by the second device to send the data information, and the second control information indicates a location of the PRBs used by the second device to send the data information.

In a feasible implementation, sending, by the first device, the first control information to the second device on the first resource includes:

sending, by the first device, the first control information to the second device on the first resource by using downlink control information DCI, to dynamically send the first control information; or sending, by the first device, the first control information to the second device on the first resource by using Radio Resource Control RRC, to semi-statically send the first control information; or sending, by the first device, the first control information to the second device on the first resource by using a system broadcast message MIB or a system message SIB.

In a feasible implementation, sending, by the first device, the second control information to the second device on the second resource includes:

sending, by the first device, the second control information to the second device on the second resource by using downlink control information DCI, to dynamically send the second control information; or sending, by the first device, the first control information to the second device on the second resource by using Radio Resource Control RRC, to semi-statically send the second control information; or sending, by the first device, the second control information to the second device on the second resource by using a system broadcast message MIB or a system message SIB.

In the control information sending method, the control information receiving method, and the device that are provided in the embodiments of the present invention, the first device sends the first control information to the second device on the first resource, so that the second device prepares the data information based on the first control information and waits for sending the data information. The first device sends second control information on the second resource different from the first resource, so that the second device sends the data information based on the second control information. In this process, the first resource is different from the second resource, so that a duration of preparing the data information by the second device is greatly greater than an interval between control information and uplink data in one time interval, and the second device has sufficient time to prepare the data information. In this way, when the control information and the uplink data coexist in one time interval, the second device prepares the data information based on the first control information sent by the first device and sends the data information based on the second control information.

DESCRIPTION OF EMBODIMENTS

Figure 1A:
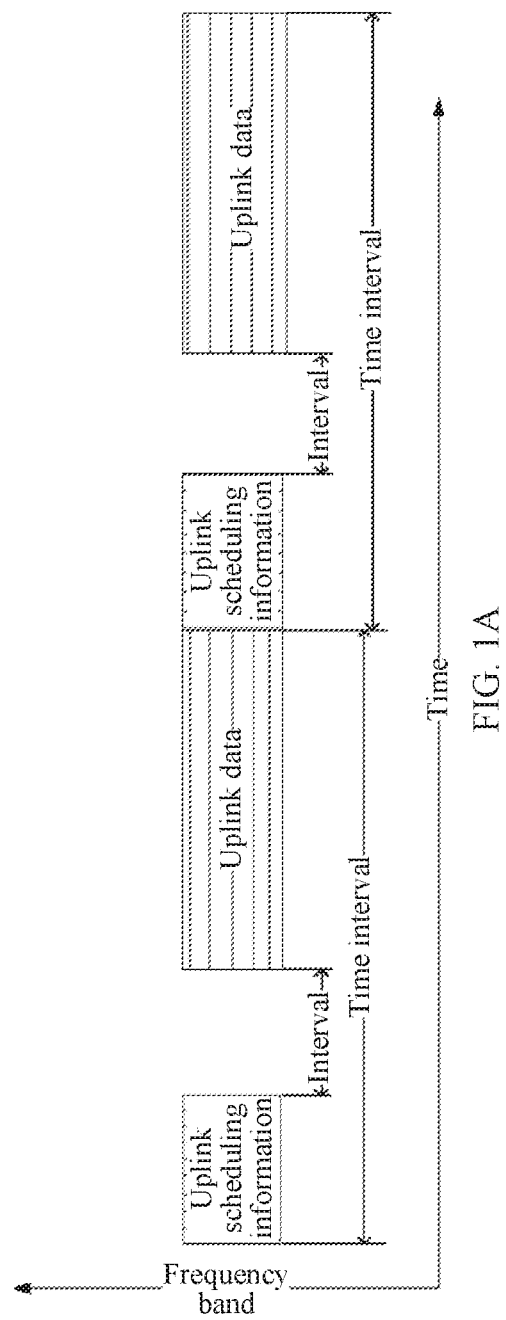
FIG. 1A is a schematic structural diagram of a self-contained subframe in a TDD mode in an uplink scheduling information sending method according to the present invention.

At present, in an LTE system, control information, for example, uplink scheduling information, is sent by a base station to UE. The control information is used to indicate a specific location of a resource occupied by the UE for subsequently sending uplink data, a frequency hopping pattern, a modulation and coding scheme (Modulation and Coding Scheme, MCS) level (MCS Level), a new data indicator (New Data Indicator, NDI), and the like. After receiving the uplink scheduling information, the UE prepares and sends uplink data. An interval from receiving the uplink scheduling information by the UE to sending the uplink data indicated by the uplink scheduling information is usually a fixed interval, for example, greater than or equal to 4 ms. The UE prepares the uplink data in the fixed interval and then sends the uplink data. In this process, there is an implicit time binding relationship, that is, the UE needs to send, within a fixed time after receiving the uplink scheduling information, the uplink data indicated by the uplink scheduling information. Content included in the uplink scheduling information is shown in Table 1.

TABLE 1

| Field name | Length | Comment |
| --- | --- | --- |
| Carrier indicator | 0 or 3 | The field exists during cross-carrier scheduling |
| Distinguishing flag of a format 0/format 1 | 1 | |
| Hopping flag | 1 | |
| N_ULhop | 1 (1.4 MHz) | Used for a scenario |
| | 1 (3 MHz) | in which the |
| | 1 (5 MHz) | hopping flag is set |
| | 2 (10 MHz) | (where tables 8.4-1 |
| | 2 (15 MHz) | and 8.4-2 in 336.213 |
| | 2 (20 MHz) | may be referenced) |
| Resource block assignment information | 5 (1.4 MHz) | Refer to 36.213 8.1 |
| | 7 (3 MHz) | |
| | 7 (5 MHz) | |
| | 11 (10 MHz) | |
| | 12 (15 MHz) | |
| | 13 (20 MHz) | |
| MCS and a version | 5 | |
| New data indicator | 1 | |
| Transmission power control for a physical uplink shared channel | 2 | Refer to the chapter 36.213 5.1.1.1 |
| Cyclic shift for a demodulation reference signal | 2 | Refer to the table 5.5.2.1.1-1 in 36.211 |
| Uplink index (only used for TDD) | 2 | The field is only used for a case in which uplink and downlink configuration is 0 in a TDD operation |
| Downlink assignment index | 2 | Used for a case in which uplink and downlink configuration is 1 to 6 in a TDD operation |

TABLE 1-continued

| Field name | Length | Comment |
|---|---|---|
| Channel state information/sounding reference signal and a resource allocation type | 1 or 2 | Refer to 36.213 7.2.1/8.1 and 8.2 |

Content in each ceil in Table 1 has a corresponding English meaning, specifically including: a field name (Field Name), a length (Length), where the length is measured in bits (bit), a comment (comment), a earner indicator (Carrier Indicator), a hopping flag (hopping flag), resource block assignment (Resource block assignment) information, a MCS and a version (MCS and RV), a new data indicator (New Data Indicator, NDI), transmission power control (Transmission Power Control, TPC) for a physical uplink shared channel (Transmission Power Control, PUSCH) (TPC for PUSCH), cyclic shift (Cyclic shift) for a demodulation reference signal (demodulation reference signal, DMRS) (Cyclic shift for DMRS), an uplink index (Uplink Index, UL Index), a downlink assignment index (Downlink Assignment Index, DAI), channel state information (Channel State Information, CSI), a sounding reference signal (Sounding Reference Signal, SRS), and a resource allocation type (Resource allocation type).

In addition, the third column of Table 1, namely, the tables and chapters referenced in the comment (comment) column, refers to tables and chapters in the $3^{rd}$ Generation Partnership Project ($3^{rd}$ Generation Partnership Project, 3GPP) standard.

Figure 1B:
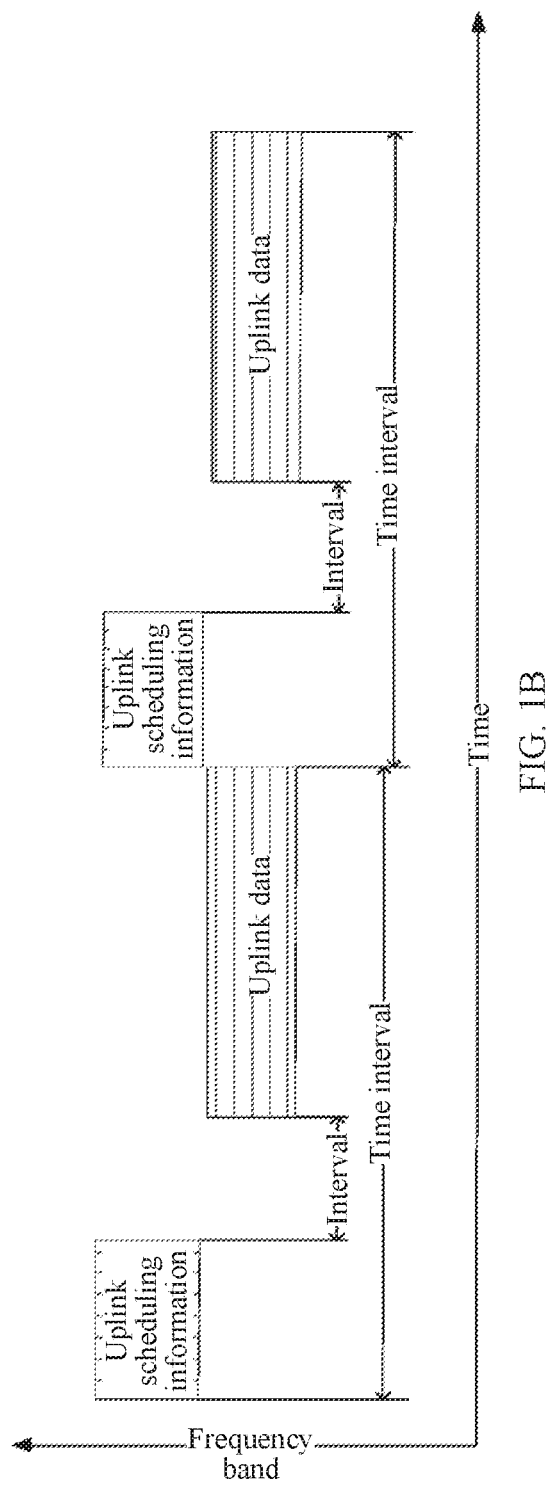
FIG. 1B is a schematic structural diagram of a self-contained subframe in an FDD mode in an uplink scheduling information sending method according to the present invention.

The foregoing uplink scheduling information is applicable to a common uplink subframe or downlink subframe. However, uplink scheduling information and uplink data coexist in a self-contained subframe in 5G in a time interval. An interval between the uplink scheduling information and the uplink data is very small and is even less than 1 ms, and may be a length of one OFDM symbol. Consequently, the UE has no sufficient time to prepare the uplink data. Specifically, referring to FIG. 1A and FIG. 1B, FIG. 1A is a schematic structural diagram of a self-contained subframe in a TDD mode in an uplink scheduling information sending method according to the present invention; FIG. 1B is a schematic structural diagram of a self-contained subframe in an FDD mode in an uplink scheduling information sending method according to the present invention.

Referring to FIG. 1A and FIG. 1B, for example, one time interval may be X ms, where M≥1. In a time interval, a part filled with vertical lines represents uplink scheduling information, a part filled with horizontal lines represents uplink data, a horizontal coordinate represents a time axis, and a vertical coordinate represents a frequency axis. In FIG. 1A, there is an interval between the uplink scheduling information and the uplink data in each time interval in a time division duplex (Time Division Duplexing, TDD) mode. In FIG. 1B, there is also an interval between the uplink scheduling information and the uplink data in each time interval in a frequency division duplex (Frequency Division Duplexing, FDD) mode. It may be learned from the foregoing that in FIG. 1A and FIG. 1B, because the interval between the uplink scheduling information and the uplink data is very small, the UE has no sufficient time to prepare the uplink data in such a small interval. Therefore, for the self-contained subframe, how to send the uplink scheduling information by a base station so that the UE prepares the uplink data based on the uplink scheduling information and sends the uplink data is a problem to be urgently resolved in the industry.

In view of this, the embodiments of the present invention provide a control information sending method, a control information receiving method, and a device, so that when uplink scheduling information and uplink data coexist in a time interval, UE prepares uplink data based on uplink scheduling information sent by a base station and sends the uplink data.

A technology described in this specification may be applied to various communications systems in which uplink scheduling information and uplink data coexist in a time interval, for example, a Global System for Mobile communications (Global System for Mobile communications, GSM) system, a Code Division Multiple Access (Code Division Multiple Access, CDMA) system, a Time Division Multiple Access (Time Division Multiple Access, TDMA) system, a Wideband Code Division Multiple Access (Wideband Code Division Multiple Access Wireless, WCDMA) system, a Frequency Division Multiple Access (Frequency Division Multiple Addressing, FDMA) system, an Orthogonal Frequency-Division Multiple Access (Orthogonal Frequency-Division Multiple Access, OFDMA) system, a single carrier-FDMA (SC-FDMA) system, a General Packet Radio Service (General Packet Radio Service, GPRS) system, a Long Term Evolution (Long Term Evolution, LTE) system, an E-UTRA system, a 5G mobile communications system, and another communications system of such type.

A first device, for example, a network side device, in the embodiments of the present invention may be a base station, an access point (Access Point, AP), or the like. The base station may refer to a device communicating with a wireless terminal by using one or more sectors over an air interface in an access network. The base station may be configured to mutually convert a received over-the-air frame and an IP packet and serve as a router between the wireless terminal and a remaining part of the access network. The remaining part of the access network may include an Internet Protocol (IP) network. The base station may further coordinate attribute management of the air interface. For example, the base station may be a base transceiver station (Base Transceiver Station, BTS) in GSM or CDMA, a NodeB (NodeB) in WCDMA, an evolved NodeB (NodeB or eNB or e-NodeB, evolved NodeB) in LTE, or a 5G base station. This is not limited in this application.

A second device, for example, user equipment, in the embodiments of the present invention may be a wired terminal or a wireless terminal. The wireless terminal may refer to a device that provides a user with voice and/or data connectivity, a handheld device with a wireless connection function, or another processing device connected to a wireless modem. The wireless terminal may communicate with one or more core networks by using a radio access network (for example, a RAN, Radio Access Network, a 5G RAN or a non-3GPP RAN). The wireless terminal may be a mobile terminal such as a mobile phone (or referred to as a "cellular" phone) and a computer with a mobile terminal, and for example, may be a portable, a pocket-sized, a handheld, a computer built-in, or an in-vehicle mobile apparatus, which exchanges voice and/or data with the radio access network. For example, the wireless terminal may be a device such as a personal communications service (Personal Communications Service, PCS) phone, a cordless telephone set, a Session Initiation Protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), a user device (User Device), or user equipment (User Equipment).

Figure 2:
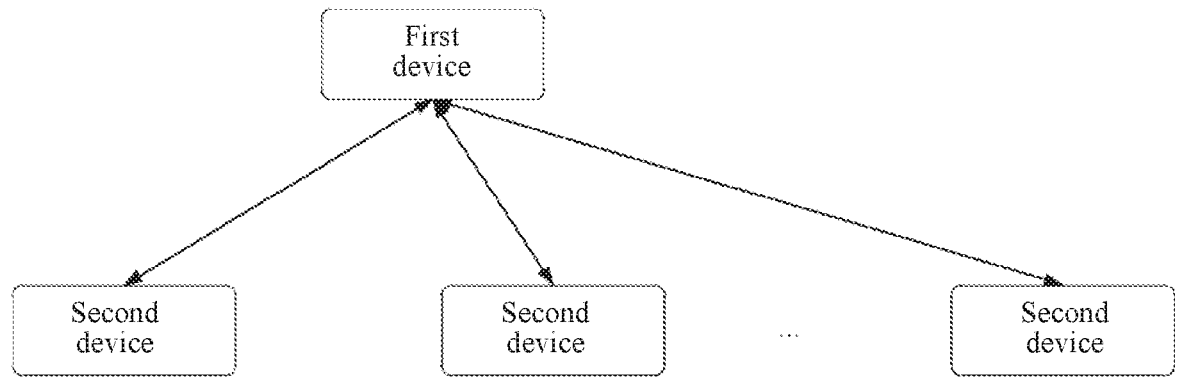
FIG. 2 is a schematic diagram of a system architecture to which an uplink scheduling information sending method is applicable according to the present invention.

FIG. 2 is a schematic diagram of a system architecture to which an uplink scheduling information sending method is applicable according to the present invention. Referring to FIG. 2, the system architecture at least includes one first device and at least one second device. A communication connection is established between the first device and each second device. Uplink scheduling information and uplink data exist in a time interval. The uplink scheduling information sending method described in the embodiments of the present invention is described in detail below based on FIG. 2. Specifically, refer to FIG. 3.

Figure 3:
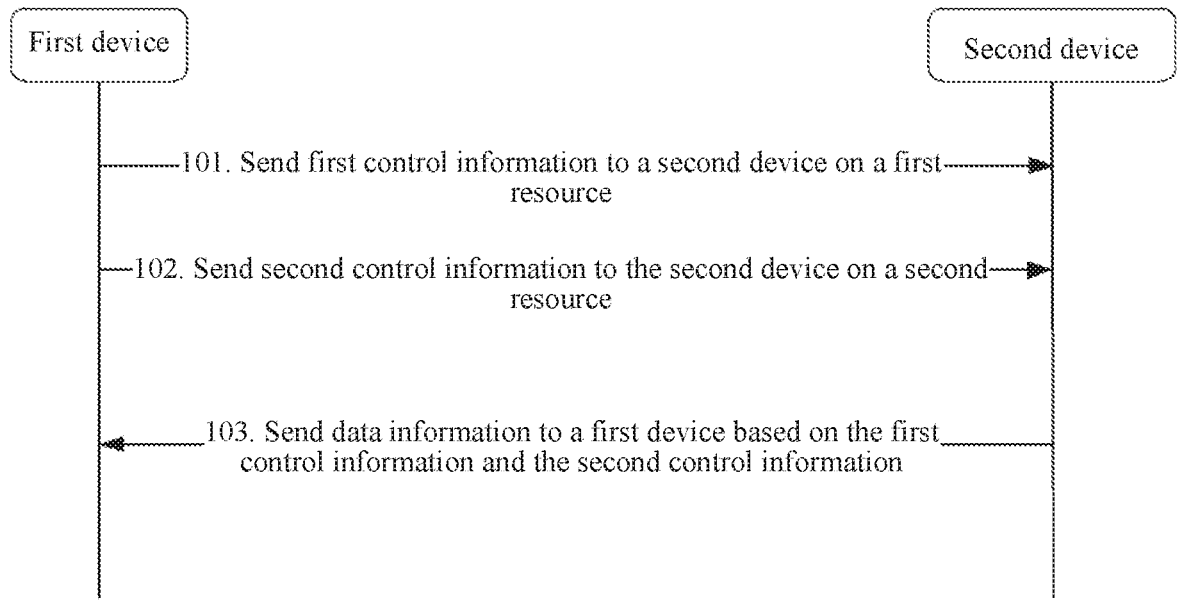
FIG. 3 is a signaling diagram of Embodiment 1 of an uplink scheduling information sending method according to the present invention.

FIG. 3 is a signaling diagram of Embodiment 1 of an uplink scheduling information sending method according to the present invention. In this embodiment of the present invention, control information is designed, to enable the control information to include first control information and second control information. The first control information and the second control information are sent by using different resources. Specifically, this embodiment includes the following steps.

101: A first device sends the first control information to a second device on a first resource.

In this step, the first device sends, to the second device on the first resource by using the first control information, a control information part that is in uplink scheduling information and that is used to indicate a size, an MCS, and the like of uplink data. Correspondingly, the second device receives the first control information sent by the first device on the first resource. The first control information may include all content or some content in Table 1, newly added content, and the like. The newly added content is, for example, a first index.

After receiving the first control information, the second device prepares data information based on the first control information, that is, prepares the uplink data based on the first control information. For example, data information of a corresponding size is prepared based on the size of the uplink data in the first control information. For another example, data information of a corresponding MCS format is prepared based on the MCS in the first control information. For still another example, data information indicated by the first index is prepared based on the first index in the first control information.

102: The first device sends second control information to the second device on a second resource.

In this step, the first device sends the second control information to the second device on the second resource different from the first resource. Correspondingly, the second device receives the second control information sent by the first device on the second resource. The second control information may include a newly added second index and some content, for example, the resource block assignment information, in Table 1, or may include only newly added content such as a second index. The second index may be used to indicate data information to be sent by the second device or indicate data information not to be sent by the second device.

In conclusion, it may be learned that in this embodiment of the present invention, the second device is instructed by using the first control information in 101 and the second control information in 102 to send the data information to the first device. Specifically, in 101, the second device prepares the data information based on the first control information and does not temporarily send the data information. The first control information has the first index. After the second control information is received in 102, the second control information has the second index, and the data information to be sent is determined based on the first index and the second index.

In 101 and 102, in a time division duplex mode, that the first resource is different from the second resource means that a time resource in the first resource is different from that in the second resource. Alternatively, in a frequency division duplex mode, that the first resource is different from the second resource means that a frequency resource in the first resource is different from that in the second resource. In addition, that the first resource is different from the second resource may alternatively mean that a codeword resource in the first resource is different from that in the second resource or the like. The first resource and the second resource are explained in detail below by using the time division duplex mode as an example. Specifically, referring to FIG. 4, FIG. 4 is a schematic diagram of examples of a first resource and a second resource in a time division duplex mode in a control information sending method according to the present invention.

Figure 4:
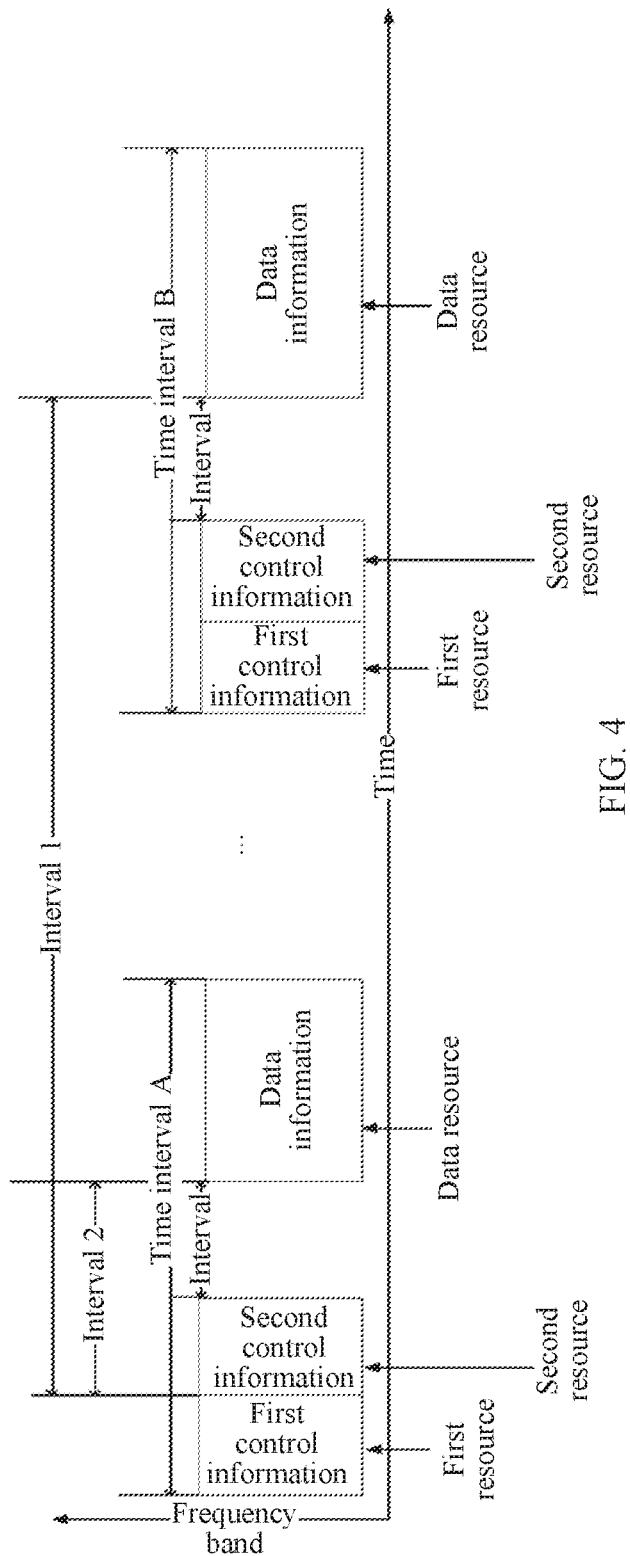
FIG. 4 is a schematic diagram of examples of a first resource and a second resource in a time division duplex mode in a control information sending method according to the present invention.

Referring to FIG. 4, in the time division duplex mode, for a specific second device, one time interval sequentially includes one duration corresponding to the first resource, one duration corresponding to the second resource, one interval between control information and uplink data, and one duration of data information.

In a feasible implementation, that the first resource is different from the second resource means that a time resource in the first resource is different from that in the second resource. For example, the first resource and the second resource are located in different time intervals. For example, the first resource is located in a time interval A, the second resource is located in a time interval B, the time interval A is previous to the time interval B, and there may be a plurality of first resources in other time intervals that are previous to the second resource in the time interval B (where the first resource in only the time interval A is shown in the figure). Assuming that first control information sent by the first device on the first resource in the time interval A instructs the second device to prepare data information, and the first device sends second control information on the second resource in the time interval B to instruct the second device to send the data information, an interval from the second resource in the time interval A to the data information in the time interval B is a duration of generating the data information by the second device, as indicated by an interval 1 in the figure. Obviously, the interval 1 includes at least one time interval, one duration corresponding to the second resource, and one interval between the control information and the uplink data. The interval 1 is greatly greater than the interval between the control information and the uplink data in one time interval, so that the second device has sufficient time to prepare the data information.

In another feasible implementation, that the first resource is different from the second resource means that the first resource and the second resource are located at different time points in a same time interval. For example, the first resource is located in a time interval A, the second resource is also located in the time interval A, and the first resource is located previous to the second resource. Assuming that first control information sent by the first device on the first resource in the time interval A instructs the second device to prepare data information, and the first device sends second control information on the second resource in the time interval A to instruct the second device to send the data information, a duration from the second resource in the time interval A to the data information is a duration of preparing the data information by the second device, as indicated by an interval 2 in the figure. Obviously, the interval 2 includes one duration corresponding to the second resource and one interval between the control information and the uplink data. The interval 2 is greater than the interval between the control information and the uplink data in one time interval, so that the second device has sufficient time to prepare the data information. This manner is applicable to a scenario in which the second device has a relatively strong capability.

103: The second device sends data information to the first device based on the first control information and the second control information.

In this step, after receiving the second control information, the second device sends the data information to the first device based on the first control information and the second control information. For example, the first control information includes the first index, and there is at least one first resource located previous to the second resource, and first control information corresponding to each first resource includes a different first index. The second control information includes the second index, and the second index corresponds to at least one first index. After receiving the second control information, the second device compares the second index included in the second control information with the first index included in each piece of first control information, to determine a matched first index. Then, data information corresponding to the first index is sent to the first device.

For example, referring to FIG. 4 again, it is assumed that a first index included in the first control information in the time interval A has a value of 1, a second index included in the second control information has a value of 2, and a first index included in first control information in a time interval assumed as a time interval X, previous to the time interval A has a value of 2. The second device starts, after a first resource in the time interval X, preparing data information corresponding to the first index having a value of 2. Finally, the second device sends, to the first device on a data resource in the time interval A, the data information corresponding to the first index having a value of 2.

For another example, referring to FIG. 4 again, it is assumed that a first index included in the first control information in the time interval A has a value of 1, and a second index included in the second control information has a value of 1. The second device starts, after the first resource in the time interval A, preparing data information corresponding to the first index having a value of 1, and sends, to the first device on a data resource in the time interval A, the data information corresponding to the first value having a value of 1.

In addition, the first index may not be set for the first control information, and the second index may not be set for the second control information. Instead, a rule is preconfigured, so that the second device sends the data information according to the rule. For example, the second device is configured to send, on a data information sending occasion in the third time interval, data information prepared based on first control information in the first time interval; and send, on a data information sending occasion in the fourth time interval, data information generated based on first control information in the second time interval. The rest can be deduced by analog.

In the uplink scheduling information sending method provided in this embodiment of the present invention, the first device sends the first control information to the second device on the first resource, so that the second device prepares the data information based on the first control information and waits for sending the data information. The first device sends the second control information on the second resource different from the first resource, so that the second device sends the data information based on the second control information. In this process, the first resource is different from the second resource, so that a duration of preparing the data information by the second device is greatly greater than the interval between the control information and the uplink data in one time interval, and the second device has sufficient time to prepare the data information. In this way, when the control information and the uplink data coexist in one time interval, the second device prepares the data information based on the first control information sent by the first device and sends the data information based on the second control information.

Optionally, in the foregoing embodiment, the first control information includes a first index, the second control information includes a second index, and the second index corresponds to the first index.

Specifically, that the second index corresponds to the first index includes, but is not limited to, the following several cases:

For example, that the second index corresponds to the first index means that the second index is the same as the first index. In this case, each piece of first control information has a different first index. After receiving the second control information, the second device determines, in a plurality of first indexes based on the second index in the second control information, a first index having a same value, and then sends, on a data information sending occasion, data information corresponding to the first index having the same value.

For another example, the second index differs from the first index by an offset value. In this case, a difference between a value of the second index and a value of the first index corresponding to the second index is a fixed offset value. For example, assuming that the offset value is 3, the difference between the value of the second index and the value of the first index is 3. After receiving the second control information, the second device determines, in a plurality of first indexes based on the second index in the second control information, a first index satisfying "the value of the second index—the value of the first index=3" or "the value of the first index—the value of the second index 3", and then sends, on a data information sending occasion, data information corresponding to the first index.

For still another example, the second index corresponds to the first index based on a function relationship. In this case, a value of the second index and a value of the first index corresponding to the second index are a fixed function. For example, assuming that the value of the second index is x, the function is f and the value of the first index is y, y=f(x). Alternatively, assuming that the value of the second index is a, the function is g, and the value of the first index is b, a=g(b). After receiving the second control information, the second device determines, in a plurality of first indexes based on the second index in the second control information, a first index satisfying "y=f(x)" or "a=g(b)", and then sends, on a data information sending occasion, data information corresponding to the first index.

For still another example, the second index corresponds to the first index based on a table relationship. In this case, a value of the second index has a table relationship with a value of the first index corresponding to the second index. The table needs to be pre-configured to the first device and the second device or is sent by the first device to the second device. For example, assuming that the value of the second index is x, the table is b, and the value of the first index is y, x corresponds to y in the table b. After receiving the second control information, the second device determines, in a plurality of first indexes based on the second index in the second control information, a first index satisfying a table correspondence, and then sends, on a data information sending occasion, data information corresponding to the first index.

Optionally, in the foregoing embodiment, in addition to being used to determine first control information based on which data information to be sent by the second device is prepared, the second control information is further used to instruct the second device whether to send the determined data information.

For example, the second control information further includes indication information. The second device is explicitly instructed, by using the indication information, whether to send the determined data information. The indication information is used to instruct the second device whether to send the data information, is a transmission indicator (Transmission Indicator), and may be indicated by using a binary code or the like. For example, when the indication information is 1, it indicates that the second device needs to send the data information. When the indication information is 0, it indicates that the second device cancels sending the data information.

For another example, the second control information instructs, by using the second index, the second device to send or not to send the data information.

Specifically, the second device may maintain a table. The table records a correspondence between a second index instructing to send data and the first index and a correspondence between a second index instructing not to send data and the first index. For example, the first index is 1, the second index that corresponds to the first index and that instructs to send the data is 2, and the second index that corresponds to the first index and that instructs not to send the data is 3. After receiving the second control information, the second device determines the second index, and correspondingly searches a table for the first index corresponding to the second index and a meaning of the second index. If the second index instructs the second device to send data information of the first index corresponding to the second index, the second device sends, on a data information sending occasion, the data information corresponding to the first index. If the second index instructs the second device not to send data information of the first index corresponding to the data information, the second device does not send or stop sending, on the data information sending occasion, the data information corresponding to the first index.

For still another example, the second control information instructs, by using a particular scrambling code of the second device, the second device to send or not to send the data information.

Specifically, when sending the second control information, the first device scrambles the second control information. If the second device needs to send the data information, the second control information is scrambled by using a first scrambling code. If the second device does not need to send the data information, the second control information is scrambled by using a second scrambling code. For example, the first scrambling code and the second scrambling code have different generation factors. After receiving the second control information, the second device decodes the second control information. If successfully decoding the second control information by using the first scrambling code, the second device sends, on a data information sending occasion, the data information corresponding to the first index corresponding to the second index. If successfully decoding the second control information by using the second scrambling code, the second device does not send or stops sending, on a data information sending occasion, the data information corresponding to the first index corresponding to the second index.

For still another example, the second control information instructs, by using a cyclic redundancy check code (Cyclic Redundancy Check) CRC of the second device, the second device to send or not to send the data information.

Specifically, when sending the second control information, the first device performs CRC check on the second control information, and scrambles the CRC by using a mask. If the second device needs to send the data information, the CRC in the second control information is scrambled by using a first mask. If the second device does not need to send the data information, the CRC in the second control information is scrambled by using a second mask. After receiving the second control information, the second device performs mask decoding and check on the CRC in the second control information. If successfully performing the mask decoding and check on the CRC by using the first mask, the second device sends, on a data information sending occasion, data corresponding to the first index corresponding to the second index. If successfully performing the mask decoding and check on the CRC by using the second mask, the second device does not send or stops sending, on a data information sending occasion, the data information corresponding to the first index corresponding to the second index.

In this embodiment of the present invention, the control information includes resource block assignment information, and the resource block assignment information includes two parts, namely, a part indicating a quantity of physical resource blocks (Physical Resource Block, PRB) used for sending the data information and a part indicating a location of the PRBs. The location of the PRBs includes a starting location of the PRBs, an ending location of the PRBs, or a specific location of the PRBs. The starting location of the PRBs is used below as an example for description.

The uplink scheduling information sending method described in this embodiment of the present invention is described in detail below from the perspective that the resource block assignment information is located in the first control information or the second control information and whether the second control information instructs the second device to send the data information.

In a feasible implementation, the first control information includes the first index, the part indicating the quantity of physical resource blocks PRBs used by the second device to send the data information, and the part indicating the starting location of the PRBs used by the second device to send the data information. The second control information includes the indication information and the second index. In this case, the first control information includes all the content in Table 1 and the first index. Specifically, referring to FIG. 2A, FIG.

2A shows only the first index included in the first control information. For content included in the second control information, refer to Table 2B.

TABLE 2A

| Field name | Length | Comment |
| --- | --- | --- |
| First index | For example, 2 or 3 | The field is used to correspond to a second index included in second control information |

TABLE 2B

| Field name | Length | Comment |
| --- | --- | --- |
| Indication information | 1 | Used to instruct the second device whether to send data information |
| Second index | 0 or 3 | The field is used to correspond to a first index included in first control information |

In Table 2B, the indication information is used to instruct the second device whether to send the data information, is a transmission indicator (Transmission Indicator), and may be indicated by using a binary code or the like. For example, when the indication information is 1, it indicates that the second device needs to transmit the data information. When the indication information is 0, it indicates that the second device cancels transmitting the data information.

In another possible implementation, compared with the foregoing possible implementation, the second control information includes only the second index and does not include the indication information. In this case, content included in the first control information includes all the content in Table 1 and the first index. Specifically, referring to FIG. 2A, FIG. 2A shows only the first index included in the first control information. For content included in the second control information, refer to Table 2C.

TABLE 2C

| Field name | Length | Comment |
| --- | --- | --- |
| Second index | 0 or 3 | The field is used to correspond to a first index included in first control information |

In still another possible implementation, the first control information includes the first index, and the part indicating the quantity of physical resource blocks PRBs used by the second device to send the data information. The second control information includes the part indicating the starting location of the PRBs used by the second device to send the data information, the second index, and the indication information. In this case, the resource block assignment information in Table 1 is modified as the quantity of physical resource blocks PRBs, and a remaining part remains unchanged. Content protected by the first control information includes all content in the modified Table 1 and the first index. Specifically, referring to Table 2D, Table 2D shows only the quantity of physical resource blocks PRBs and the first index. For content included in the second control information, refer to Table 2E.

TABLE 2D

| Field name | Length | Comment |
| --- | --- | --- |
| Quantity of physical resource blocks PRBs | 3 (1.4 MHz) 4 (3 MHz) 5 (5 MHz) 6 (10 MHz) 7 (15 MHz) 7 (20 MHz) | Used to indicate a quantity of PRBs used by the second device to send data information |
| First index | 0 or 3 | The field is used to correspond to a second index included in second control information |

TABLE 2E

| Field name | Length | Comment |
| --- | --- | --- |
| Starting location of PRBs | 5 (1.4 MHz) 7 (3 MHz) 7 (5 MHz) 11 (10 MHz) 12 (15 MHz) 13 (20 MHz) | Refer to 36.213 8.1 |
| Indication information | 1 | Used to instruct the second device whether to send data information |
| Second index | 0 or 3 | The field is used to correspond to a first index included in first control information |

In this manner, the second control information may not include the indication information.

In the foregoing embodiments, the second device determines, based on the value of the second index in the second control information, the first index having the same value in the first control information previously sent on the first resource, then determines, based on the indication information, whether to send the data information, and sends or does not send the data information corresponding to the first index. Specifically, refer to FIG. 5.

Figure 5:
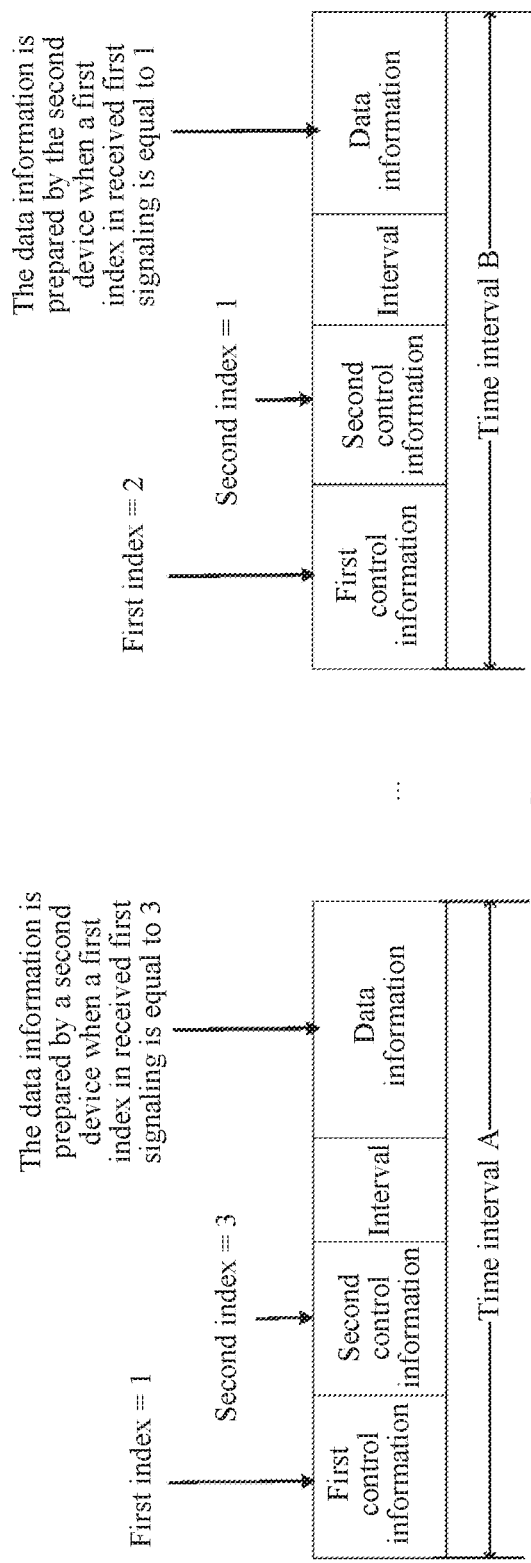
FIG. 5 is a schematic diagram of sending in a time division duplex mode in an uplink scheduling information sending method according to the present invention.

FIG. 5 is a schematic diagram of sending in a time division duplex mode in an uplink scheduling information sending method according to the present invention. Referring to FIG. 5, in a time interval A, a value of a first index in first control information is 1, and a value of a second index in second control information is 3. After receiving the first control information, the second device starts preparing data information corresponding to the first index having the value of 1. In a time interval B, a value of a first index in first control information is 2, and a value of a second index in second control information is 1. After receiving the first control information, the second device starts preparing data information corresponding to the first index having the value of 2; and after receiving the second control information in which the second index is 1, sends, in a data information time, the data information that stalls being prepared in the time interval A and that corresponds to the first index having the value of 1. It is assumed herein that a correspondence between the first index and the second index is an equivalence relationship, and the second index in the equivalence relationship indicates that the corresponding data is to be sent.

Optionally, in the foregoing embodiment, when there are a plurality of second devices, the first device may send first control information and second control information to the second devices in parallel. In this case, the first device sends the first control information to the second devices on the first resource, and the first devices have different first control information. The first device sends the second control information to the second devices on the second resource, and the second devices have different second control information. The plurality of second devices are simultaneously scheduled in a same time interval.

Optionally, in the foregoing embodiment, the first device sends the first control information to the second device on the first resource by using downlink control information (Downlink Control Information, DCI), to dynamically send the first control information. Alternatively, the first device sends the first control information to the second device on the first resource by using Radio Resource Control (Radio Resource Control, RRC), to semi-statically send the first control information. Alternatively, the first device sends the first control information to the second device on the first resource by using a system broadcast message (Master Information Block, MIB) or a system message (System Information Block, SIB).

Similarly, the first device sends the second control information to the second device on the second resource by using downlink control information DCI, to dynamically send the second control information. Alternatively, the first device sends the second control information to the second device on the second resource by using Radio Resource Control RRC, to semi-statically send the second control information. Alternatively, the first device sends the second control information to the second device on the second resource by using a system broadcast message MIB or a system message SIB.

Usually, an uplink hybrid automatic repeat request (Hybrid Automatic Repeat reQuest, HARQ) includes a non-adaptive uplink HARQ and an adaptive HARQ. Next, the uplink scheduling information sending method described in the present invention is described in detail by using an example in which the first device is specifically a base station (eNB), the second device is specifically UE, and the data information is specifically an uplink hybrid automatic repeat request (Hybrid Automatic Repeat reQuest, HARQ). Specifically, refer to FIG. 6A and FIG. 6B.

Figure 6A:
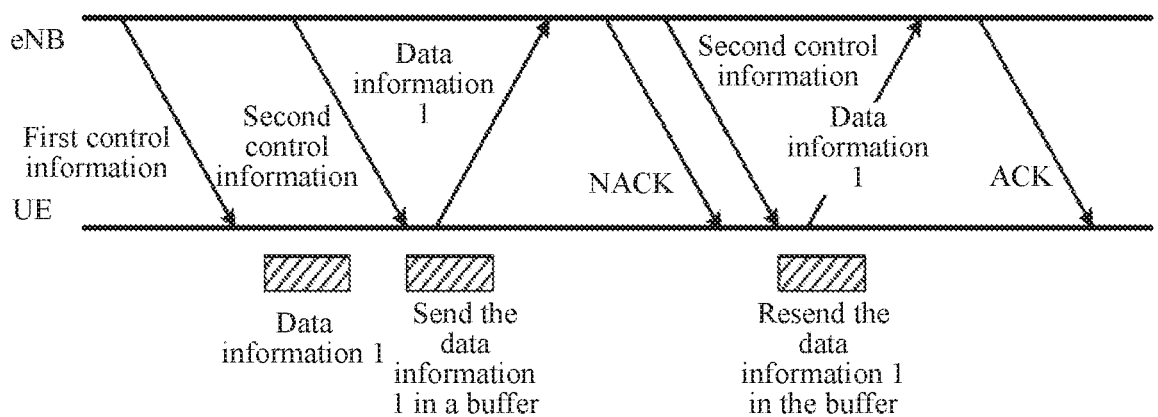
FIG. 6A is a schematic diagram of a process of applying an uplink scheduling information sending method to a non-adaptive HARQ according to the present invention.

FIG. 6A is a schematic diagram of a process of applying an uplink scheduling information method to a non-adaptive HARQ according to the present invention. Referring to FIG. 6A, an eNB sends first control information to UE on a first resource. After receiving the first control information, the UE prepares data information 1 (as represented by a part filled with slashes in the figure), and stores the data information 1 in a buffer (buffer). The eNB sends second control information to the UE on a second resource. Assuming that a first index in the first control information has a same value as that of a second index in the second control information, after receiving the second control information, the UE sends the data information 1 in the buffer.

If correctly receiving the data information 1, the eNB sends an acknowledgement (acknowledge, ACK) to the UE. If not correctly receiving the data information 1, the eNB makes a different response.

In a possible implementation, the eNB returns a negative acknowledgement (non-acknowledge, NACK) to the UE for scheduling retransmission. After receiving the NACK, the UE retransmits the data information 1 previously prepared in the buffer. A time interval between the NACK and a retransmitted data packet needs to be pre-configured as, for example, one time interval.

In another possible implementation, the eNB resends the second control information to the UE. After receiving the second control information, the UE resends the data information 1 in the buffer to the eNB. In this process, the NACK is omitted, so that scheduling of the eNB is more flexible. The second control information and the data information 1 are resent in a same time interval or in a pre-configured tune interval.

In still another possible implementation, the eNB resends the second control information and the NACK to the UE. After receiving the second control information and the NACK, the UE resends the data information 1 in the buffer to the eNB. In this process, control signal redundancy is caused, and an advantage is that accuracy of control information can be improved.

Figure 6B:
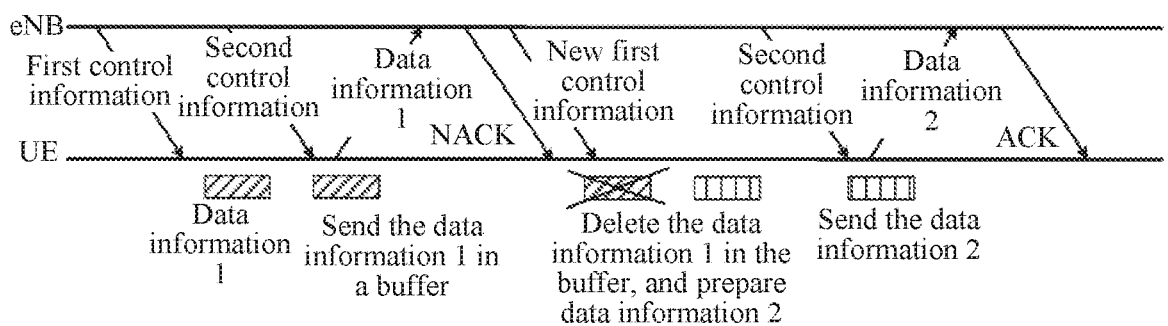
FIG. 6B is a schematic diagram of a process of applying an uplink scheduling information sending method to an adaptive HARQ according to the present invention.

FIG. 6B is a schematic diagram of a process of applying an uplink scheduling information method to an adaptive HARQ according to the present invention. Referring to FIG. 6B, an eNB sends first control information to UE on a first resource. After receiving the first control information, the UE prepares data information 1 (as represented by a part filled with slashes in the figure), and stores the data information 1 in a buffer (buffer). The eNB sends second control information to the UE on a second resource. Assuming that a first index in the first control information has a same value as that of a second index in the second control information, after receiving the second control information, the UE sends the data information 1 in the buffer. If correctly receiving the data information 1, the eNB sends an acknowledgement (acknowledge, ACK) to the UE. If not correctly receiving the data information 1, the eNB returns a negative acknowledgement (non-acknowledge, NACK) to the UE, and resends first control information to the UE; or the eNB does not send a NACK and directly sends first control information. An NDI is used to indicate whether an initially transmitted data packet or a retransmitted data packet is scheduled. A first index in the re-sent first control information and a first index in the previously sent first control information have different values. After receiving the new first control information, the UE deletes the data information 1 in the buffer, and prepares data information 2 (as represented by a part filled with vertical lines in the figure) based on the newly received first control information. The eNB sends second control information to the UE. If a second index in the second control information has a same value as that of the first index in the first control information, after receiving the second control information, the UE sends the data information 2 in the buffer to the eNB.

In the foregoing embodiments, the control information is designed to include the first control information and the second control information. The first control information and the second control information are sent by using different resources. The control information sending method described in the embodiment of the present invention is described in detail. However, the embodiments of the present invention are not limited thereto. In another feasible implementation, the control information may not be designed to include the first control information and the second control information, and only new information is added to the control information. The second device is instructed by using the new information to send the data information in an appropriate time.

Specifically, time offset (time offset) information may be added to the control information. A time period from receiving uplink scheduling information by the second device to sending the data information is indicated by using the time offset information. In this case, the control information includes all the content in Table 1 and the newly added time offset information. Specifically, referring to Table 3, Table 3 shows only the time offset included in the control information.

TABLE 3

| Field name | Length | Comment |
| --- | --- | --- |
| Time offset | X | Instruct the second device to send data information X subframes later after receiving control information |

It should be noted that the time offset in Table 3 refers to a quantity of subframes after which the data information is sent. However, the present invention is not limited thereto. In another feasible implementation, the time offset may alternatively refer to a quantity of symbols or frames after which the data information is sent. In this process, the time offset is an interval of preparing the data information by the second device.

Next, a process of instructing, by using the time offset, the second device to send the data information in the control information sending method in the present invention is explained in detail by using an embodiment. Specifically, refer to FIG. 7.

Figure 7:
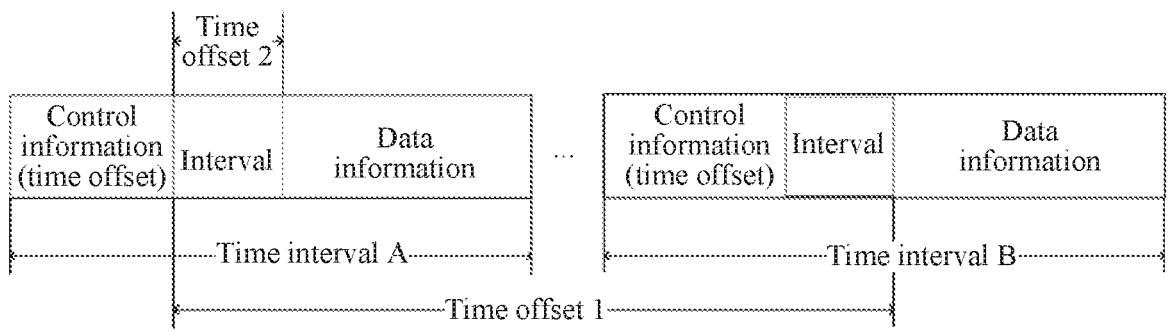
FIG. 7 is a schematic diagram of a process of instructing, by using a time offset, a second device to send data information in a control information sending method according to the present invention.

FIG. 7 is a schematic diagram of a process of instructing, by using a time offset, a second device to send data information in a control information sending method according to the present invention. Referring to FIG. 7, one time interval sequentially includes a duration of sending control information, a duration of an interval between uplink scheduling information and uplink data, and a duration of sending data information. The control information includes a time offset.

In a feasible implementation, a duration indicated by the time offset included in the control information is relatively large. In this case, the control information is located in a time interval A. The second device prepares data information based on the control information, and sends the data information in a time interval B. The time offset is represented by a time offset 1 in the figure.

In another feasible implementation, a duration indicated by the time offset included in the control information is relatively small. In this case, the control information is located in a time interval A. The second device prepares data information based on the control information, and sends the data information in a time interval A. The time offset is represented by a time offset 2 in the figure.

Figure 8:
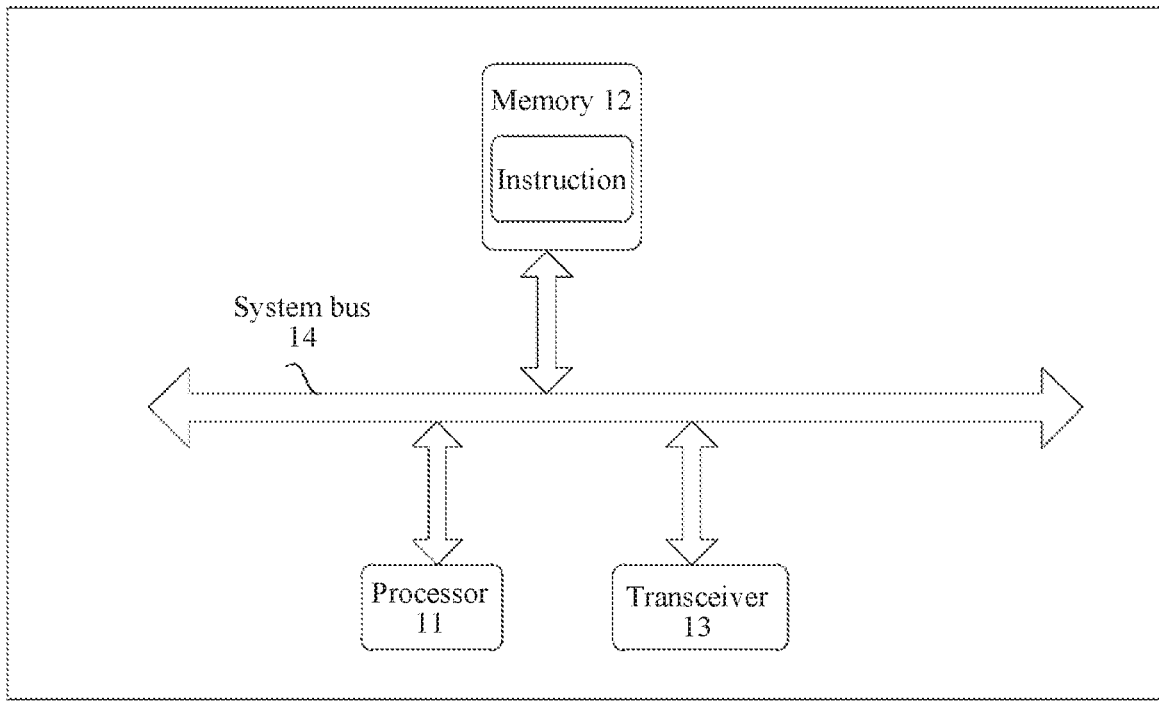
FIG. 8 is a schematic structural diagram of a first device according to the present invention.

FIG. 8 is a schematic structural diagram of a first device according to the present invention. The first device provided in this embodiment can implement steps of the method that is applied to the first device and that is provided in any embodiment of the present invention. Specifically, the first device provided in this embodiment includes a processor 11, a memory 12, a transceiver 13, and a system bus 14. The memory 12 is connected to the processor 11 and completes communication with the processor 11 by using the system bus 14. The memory 12 is configured to store a computer executable instruction. The processor 11 is configured to run the computer executable instruction, so that the transceiver 13 sends first control information to a second device on a first resource and sends second control information to the second device on a second resource.

The first resource is different from the second resource, and the first control information and the second control information are used to instruct the second device to send data information to the first device.

The first device provided in this embodiment of the present invention sends the first control information to the second device on the first resource, so that the second device prepares the data information based on the first control information and waits for sending the data information. The first device sends the second control information on the second resource different from the first resource, so that the second device sends the data information based on the second control information. In this process, the first resource is different from the second resource, so that a duration of preparing the data information by the second device is greatly greater than an interval between control information and uplink data in one time interval, and the second device has sufficient time to prepare the data information. In this way, when the control information and the uplink data coexist in one time interval, the second device prepares the data information based on the first control information sent by the first device and sends the data information based on the second control information.

Optionally, in an embodiment of the present invention, that the first resource is different from the second resource includes: a time resource in the first resource is different from that in the second resource; or a frequency resource in the first resource is different from that in the second resource: or a codeword resource in the first resource is different from that in the second resource.

Optionally, in an embodiment of the present invention, the first control information includes a first index, the second control information includes a second index, and the second index corresponds to the first index.

Optionally, in an embodiment of the present invention, that the second index corresponds to the first index includes: the second index is the same as the first index; or the second index differs from the first index by an offset value; or the second index corresponds to the first index based on a function relationship; or the second index corresponds to the first index based on a table relationship.

Optionally, in an embodiment of the present invention, the second control information instructs the second device to send or not to send the data information.

Optionally, in an embodiment of the present invention, the second control information instructs, by using indication information, the second device to send or not to send the data information.

Alternatively, the second control information instructs, by using the second index, the second device to send or not to send the data information.

Alternatively, the second control information instructs, by using a particular scrambling code of the second device, the second device to send or not to send the data information.

Alternatively, the second control information instructs, by using a cyclic redundancy check code CRC of the second device, the second device to send or not to send the data information.

Optionally, in an embodiment of the present invention, the first control information indicates a quantity of physical resource blocks PRBs used by the second device to send the data information and a location of the PRBs used by the second device to send the data information.

Alternatively, the first control information indicates a quantity of physical resource blocks PRBs used by the second device to send the data information, and the second control information indicates a location of the PRBs used by the second device to send the data information.

Optionally, in an embodiment of the present invention, the transceiver 13 is specifically configured to: send the first control information to the second device on the first resource by using downlink control information DCI; or send the first control information to the second device on the first resource by using Radio Resource Control RRC; or send the first control information to the second device on the first resource by using a system broadcast message MIB or a system message SIB.

Optionally, in an embodiment of the present invention, the transceiver 13 is specifically configured to: send the second control information to the second device on the second resource by using downlink control information DCI; or send the second control information to the second device on the second resource by using Radio Resource Control RRC; or send the second control information to the second device on the second resource by using a system broadcast message MIB or a system message SIB.

Figure 9:
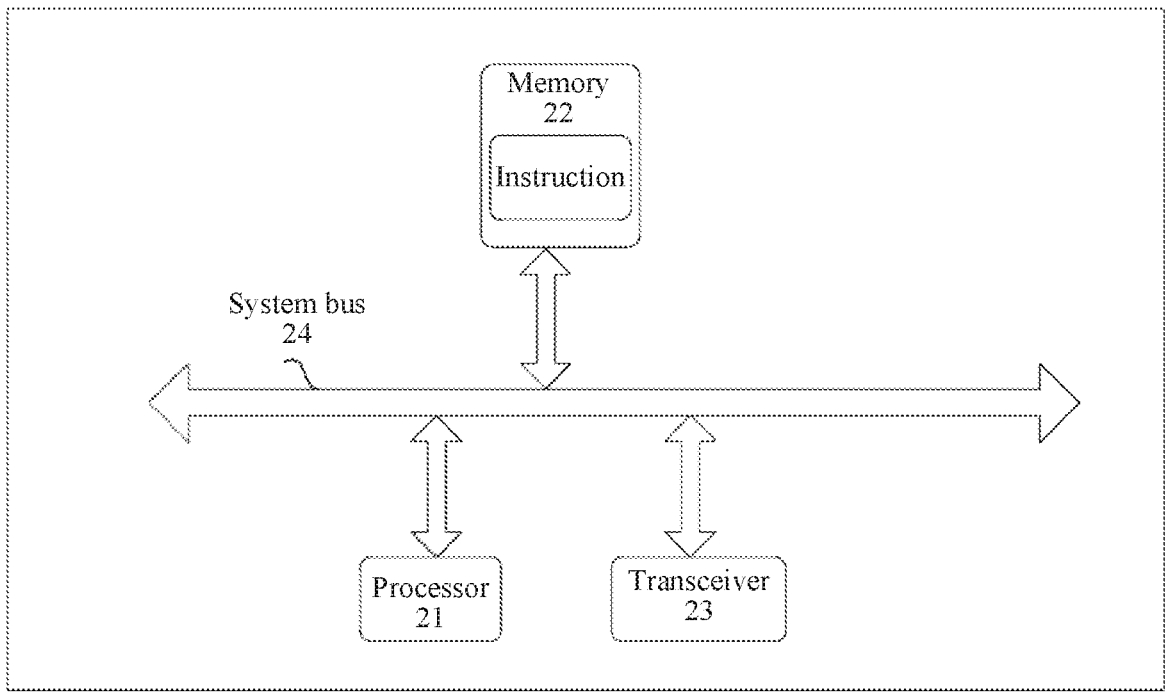
FIG. 9 is a schematic structural diagram of a second device according to the present invention.

FIG. 9 is a schematic structural diagram of a second device according to the present invention. The second device provided in this embodiment includes a processor 21, a memory 22, a transceiver 23, and a system bus 24. The memory 22 is connected to the processor 21 and completes communication with the processor 21 by using the system bus 24. The memory 22 is configured to store a computer executable instruction. The processor 21 is configured to run the computer executable instruction, so that the transceiver 23 receives first control information sent by a first device on a first resource and second control information sent by the first device on a second resource; and the transceiver 23 sends data information to the first device based on the first control information and the second control information, where the first resource is different from the second resource.

In the second device provided in this embodiment of the present invention, the first device sends the first control information to the second device on the first resource. Correspondingly, the second terminal receives the first control information, prepares the data information based on the first control information, and waits for sending the data information. The second device further receives the second control information sent by the first device on the second resource different from the first resource, and sends the data information based on the second control information. In this process, the first resource is different from the second resource, so that a duration of preparing the data information by the second device is greatly greater than an interval between control information and uplink data in one time interval, and the second device has sufficient time to prepare the data information. In this way, when the control information and the uplink data coexist in one time interval, the second device prepares the data information based on the first control information sent by the first device and sends the data information based on the second control information.

Optionally, in an embodiment of the present invention, that the first resource is different from the second resource includes: a time resource in the first resource is different from that in the second resource; or a frequency resource in the first resource is different from that in the second resource: or a codeword resource in the first resource is different from that in the second resource.

Optionally, in an embodiment of the present invention, the first control information includes a first index, the second control information includes a second index, and the second index corresponds to the first index.

Optionally, in an embodiment of the present invention, that the second index corresponds to the first index includes: the second index is the same as the first index; or the second index differs from the first index by an offset value; or the second index corresponds to the first index based on a function relationship; or the second index corresponds to the first index based on a table relationship.

Optionally, in an embodiment of the present invention, the processor 21 is configured to determine, based on the second control information, whether to send the data information to the first device.

Optionally, in an embodiment of the present invention, the processor 21 is specifically configured to: determine, based on indication information included in the second control information, whether to send the data information to the first device; or determine, based on the second index in the second control information, whether to send the data information to the first device; or determine, based on a particular scrambling code of the second device, whether to send the data information to the first device; or determine, based on a cyclic redundancy check code CRC of the second device, whether to send the data, information to the first device.

Optionally, in an embodiment of the present invention, the first control information indicates a quantity of physical resource blocks PRBs used by the second device to send the data information and a location of the PRBs used by the second device to send the data information.

Alternatively, the first control information indicates a quantity of physical resource blocks PRBs used by the second device to send the data information, and the second control information indicates a location of the PRBs used by the second device to send the data information.

Optionally, in an embodiment of the present invention, the transceiver 23 is specifically configured to: receive the first control information sent by the first device on the first resource by using downlink control information DCI; or receive the first control information sent by the first device on the first resource by using Radio Resource Control RRC; or receive the first control information sent by the first device on the first resource by using a system broadcast message MIB or a system message SIB.

Optionally, in an embodiment of the present invention, the transceiver 23 is specifically configured to: receive the second control information sent by the first device on the second resource by using downlink control information DCI; or receive the second control information sent by the first device on the second resource by using Radio Resource Control RRC; or receive the second control information sent by the first device on the second resource by using a system broadcast message MIB or a system message SIB.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or a compact disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink scheduling information sending method, comprising:
   sending, by a network side device, first uplink scheduling information and second uplink scheduling information to user equipment (UE) on a first time resource to enable the UE to prepare data information based on the first uplink scheduling information of the first time resource; and
   sending, by the network side device, another first uplink scheduling information and another second uplink scheduling information to the UE on a second time resource, wherein the first time resource is different from the second time resource, and wherein the first uplink scheduling information of the first time resource and second uplink scheduling information of the second time resource are used to instruct the UE to send the data information to the network side device,
   wherein the first uplink scheduling information of the first time resource comprises a first index,
   wherein the second uplink scheduling information of the second time resource comprises a second index, and
   wherein the second index of the second uplink scheduling information of the second time resource corresponds to the first index of the first uplink scheduling information of the first time resource.

2. The uplink scheduling information sending method of claim 1, wherein the second uplink scheduling information of the second time resource instructs the UE to send or not to send the data information.

3. The uplink scheduling information sending method of claim 1, wherein either the first uplink scheduling information of the first time resource indicates a quantity of physical resource blocks (PRBs) used by the UE to send the data information and a location of the PRBs used by the UE to send the data information, or the first uplink scheduling information of the first time resource indicates a quantity of PRBs used by the UE to send the data information, and the second uplink scheduling information of the second time resource indicates a location of the PRBs used by the UE to send the data information.

4. The uplink scheduling information sending method of claim 1, wherein sending, by the network side device, the first uplink scheduling information and the second uplink scheduling information to the UE on the first time resource comprises:
   sending, by the network side device, the first uplink scheduling information and the second uplink scheduling information to the UE on the first time resource by using downlink control information (DCI);
   sending, by the network side device, the first uplink scheduling information and the second uplink scheduling information to the UE on the first time resource by using Radio Resource Control (RRC); or
   sending, by the network side device, the first uplink scheduling information and the second uplink scheduling information to the UE on the first time resource by using a master information block (MIB) or a system information block (SIB).

5. The uplink scheduling information sending method of claim 1, wherein sending, by the network side device, the other first uplink scheduling information and the other second uplink scheduling information to the UE on the second time resource comprises:
   sending, by the network side device, the other first uplink scheduling information and the other second uplink scheduling information to the UE on the second time resource using downlink control information (DCI);
   sending, by the network side device, the other first uplink scheduling information and the other second uplink scheduling information to the UE on the second time resource by using Radio Resource Control (RRC); or
   sending, by the network side device, the other first uplink scheduling information and the other second uplink scheduling information to the UE on the second time resource using a master information block (MIB) or a system information block (SIB).

6. An uplink scheduling information receiving method, comprising:
   receiving, by user equipment (UE), first uplink scheduling information and second uplink scheduling information sent by a network side device on a first time resource;
   preparing, by the UE, data information based on the first uplink scheduling information of the first time resource;
   receiving, by the UE, another first uplink scheduling information and another second uplink scheduling information sent by the network side device on a second time resource; and
   sending, by the UE, the data information to the network side device based on the first uplink scheduling information of the first time resource and the second uplink scheduling information of the second time resource,
   wherein the first time resource is different from the second time resource,
   wherein the first uplink scheduling information of the first time resource comprises a first index,
   wherein the second uplink scheduling information of the second time resource comprises a second index, and
   wherein the second index of the second uplink scheduling information of the second time resource corresponds to the first index of the first uplink scheduling information of the first time resource.

7. The uplink scheduling information receiving method of claim 6, further comprising determining, by the UE based on the second uplink scheduling information of the second time resource, whether to send the data information to the network side device.

8. The uplink scheduling information receiving method of claim 6, further comprising:
   determining, by the UE based on the first uplink scheduling information of the first time resource, a quantity of physical resource blocks (PRBs) to send the data information and a location of the PRBs to send the data information; or
   determining, by the UE, based on the first uplink scheduling information of the first time resource, a quantity of PRBs to send the data information, and based on the second uplink scheduling information of the second time resource, a location of the PRBs used by the UE to send the data information.

9. A network side device, comprising:
   a processor;
   a memory;
   a transceiver; and a system bus,
   wherein the memory is connected to the processor and completes communication with the processor using the system bus,
   wherein the memory is configured to store a computer executable instruction that, when executed by the processor, cause the network side device to:

send first uplink scheduling information and second uplink scheduling information to user equipment (UE) on a first time resource so that the UE prepares data information based on the first uplink scheduling information of the first time resource; and send another first uplink scheduling information and another second uplink scheduling information to the UE on a second time resource, wherein the first time resource is different from the second time resource, wherein the first uplink scheduling information of the first time resource and the second uplink scheduling information of the second time resource are used to instruct the UE to send the data information to the network side device, wherein the first uplink scheduling information of the first time resource comprises a first index, wherein the second uplink scheduling information of the second time resource comprises a second index, and wherein the second index of the second uplink scheduling information of the second time resource corresponds to the first index of the first uplink scheduling information of the first time resource.

10. The network side device of claim 9, wherein second control information of the second time resource instructs the UE to send or not to send the data information.

11. The network side device of claim 9, wherein either the first uplink scheduling information of the first time resource indicates a quantity of physical resource blocks (PRBs) used by the UE to send the data information and a location of the PRBs used by the UE to send the data information, or the first uplink scheduling information indicates a quantity of PRBs used by the UE to send the data information, and the second uplink scheduling information of the second time resource indicates a location of the PRBs used by a second device to send the data information.

12. The network side device of claim 9, wherein the instructions further cause the network device to:

send the first uplink scheduling information and the second uplink scheduling information to the UE using downlink control information (DCI);

send the first uplink scheduling information and the second uplink scheduling information to the UE using Radio Resource Control (RRC); or send the first uplink scheduling information and the second uplink scheduling information to the UE using a master information block (MIB) or a system information block (SIB).

13. User equipment (UE), comprising:
a processor;
a memory;
a transceiver; and
a system bus,
wherein the memory is connected to the processor and completes communication with the processor using the system bus,
wherein the memory is configured to store a computer executable instruction, and
wherein the processor is configured to run the computer executable instruction that, when executed by the processor, causes the UE to:
receive first uplink scheduling information and second uplink scheduling information sent by a network side device on a first time resource;
receive another first uplink scheduling information and another second uplink scheduling information sent by the network side device on a second time resource;
prepare data information based on the first uplink scheduling information of the first time resource; and
send the data information to the network side device based on the first uplink scheduling information of the first time resource and the second uplink scheduling information of the second time resource,
wherein the first time resource is different from the second time resource,
wherein the first uplink scheduling information of the first time resource comprises a first index,
wherein the second uplink scheduling information of the second time resource comprises a second index, and
wherein the second index of the second uplink scheduling information of the second time resource corresponds to the first index of the first uplink scheduling information of the first time resource.

14. The UE of claim 13, wherein the instructions further cause the UE to determine, based on the second uplink scheduling information of the second time resource, whether to send the data information to the network side device.

15. The UE of claim 13, wherein the instructions further cause the UE to:
determine, based on the first uplink scheduling information of the first time resource, a quantity of physical resource blocks (PRBs) to send the data information and a location of the PRBs to send the data information; or
determine, based on the first uplink scheduling information of the first time resource, a quantity of PRBs to send the data information and determine, based on the second uplink scheduling information of the second time resource, a location of the PRBs to send the data information.

* * * * *